United States Patent
Berry et al.

(10) Patent No.: US 10,584,762 B2
(45) Date of Patent: Mar. 10, 2020

(54) DISRUPTIVE TUNED MASS SYSTEM AND METHOD

(71) Applicants: Robert Berry, Huntsville, AL (US); Jeff Lindner, Huntsville, AL (US)

(72) Inventors: Robert Berry, Huntsville, AL (US); Jeff Lindner, Huntsville, AL (US)

( * ) Notice: Subject to any disclaimer, the term of this patent is extended or adjusted under 35 U.S.C. 154(b) by 99 days.

(21) Appl. No.: 15/471,341

(22) Filed: Mar. 28, 2017

(65) Prior Publication Data
US 2017/0276209 A1 Sep. 28, 2017

Related U.S. Application Data

(60) Provisional application No. 62/314,178, filed on Mar. 28, 2016.

(51) Int. Cl.
*F16F 15/00* (2006.01)
*F16F 15/023* (2006.01)
(Continued)

(52) U.S. Cl.
CPC .......... *F16F 15/002* (2013.01); *F16F 7/1005* (2013.01); *F16F 7/116* (2013.01); *F16F 15/023* (2013.01); *F16K 15/16* (2013.01); *G01M 7/025* (2013.01); *F16F 2228/04* (2013.01); *G05D 7/0173* (2013.01)

(58) Field of Classification Search
CPC ...... F16F 15/002; F16F 15/023; F16F 7/1005; F16F 7/116; F16F 2228/04; G01M 7/025; F16K 15/16; G05D 7/0173
USPC ..... 188/379, 378, 380, 267, 267.2; 267/136, 267/140.14, 140.15
See application file for complete search history.

(56) References Cited

U.S. PATENT DOCUMENTS

| 989,958 A | 4/1911 | Frahm |
| 2,585,382 A | 2/1952 | Guernsey |

(Continued)

FOREIGN PATENT DOCUMENTS

| EP | 0676559 A1 * | 10/1995 |
| EP | 2584214 A2 | 4/2013 |
| WO | 2011064348 A1 | 6/2011 |

OTHER PUBLICATIONS

S.V. Bakre et al., Optimum X-plate dampers for seismic response control of piping systems, Mumbai, India.
(Continued)

*Primary Examiner* — Pamela Rodriguez
(74) *Attorney, Agent, or Firm* — Angela Holt; Bradley Arant Boult Cummings LLP

(57) ABSTRACT

A tuned mass system has a bulk mass acted upon by an excitation amplitude and a reaction mass coupled to the bulk mass. A resistance-to-motion controlled coupling mechanism associated with the reaction mass is configured to proportionally modulate independent of excitation force such that the relative phase of the bulk mass and the reaction mass is substantially constant throughout an extended range of excitation amplitude. The resistance-to-motion controlled coupling mechanism is a Variable Aperture Reciprocating Reed (VARR) Valve in one embodiment, and operates as a passive mechanism. In other embodiments, active resistance-to-motion controlled coupling mechanisms are employed.

15 Claims, 11 Drawing Sheets
(10 of 11 Drawing Sheet(s) Filed in Color)

(51) Int. Cl.
*F16K 15/16* (2006.01)
*G01M 7/02* (2006.01)
*F16F 7/10* (2006.01)
*F16F 7/116* (2006.01)
*G05D 7/01* (2006.01)

(56) References Cited

U.S. PATENT DOCUMENTS

| | | |
|---|---|---|
| 3,401,911 A | 9/1968 | Lazan |
| 4,509,781 A | 4/1985 | Dick et al. |
| 4,583,912 A | 4/1986 | Ball et al. |
| 4,807,840 A | 2/1989 | Baker et al. |
| 5,070,663 A | 12/1991 | Sakai et al. |
| 5,447,001 A | 9/1995 | Nishimura et al. |
| 5,456,341 A * | 10/1995 | Garnjost ............. B60G 17/018 188/378 |
| 5,505,282 A | 4/1996 | Olgac |
| 5,558,191 A | 9/1996 | Lai |
| 5,775,472 A | 7/1998 | Osterberg et al. |
| 5,816,373 A | 10/1998 | Osterberg et al. |
| 5,884,892 A | 3/1999 | Gassen et al. |
| 5,915,508 A | 6/1999 | Lai |
| 6,026,776 A | 2/2000 | Winberg |
| 6,202,994 B1 | 3/2001 | Spurlin |
| 6,454,063 B1 | 9/2002 | Osterberg et al. |
| 6,634,472 B1 | 10/2003 | Davis et al. |
| 6,874,748 B2 | 4/2005 | Hanagan |
| 7,681,701 B2 | 3/2010 | Mikonaho |
| 8,745,977 B2 | 6/2014 | Spieth |
| 8,800,736 B2 | 8/2014 | Kashani |
| 8,939,178 B1 | 1/2015 | Lindner et al. |
| 2003/0222386 A1 | 12/2003 | Duerre et al. |
| 2010/0057260 A1 * | 3/2010 | Fallahi ............. F16F 7/1005 700/280 |
| 2010/0258647 A1 | 10/2010 | Ho |
| 2010/0269424 A1 | 10/2010 | Marioni |
| 2014/0202812 A1 | 7/2014 | Hauf |

OTHER PUBLICATIONS

Adam Marsh et al., A numerical investigation of energy dissipation with a shallow depth sloshing absorber, Applied Mathematical Modelling, www.elsevier.com/locate/apm, Jan. 13, 2010.

Swaroop K. Yalla et al., Optimum Absorber Parameters for Tuned Liquid Column Dampers, Journal of Structural Engineering, Aug. 2000.

Min Ho Chey, Passive and Semi-Active Tuned Mass Damper Building Systems, University of Canterbury, Christchurch, New Zealand, 2007.

Henry A. Sodano et al., Improved Eddy Current Damping Model for Transverse Vibrations.

Satish Nagarajaiah et al, Torsion in Base-Isolated Structures with Elastomeric Isolation Systems, Journal of Structural Engineering, vol. 119, No. 10, Oct. 1993.

Tuned Mass Damper Systems, ConCh04v2.fm, p. 217, Jul. 11, 2002.

Wikipedia, Damper, retrieved from "https://en.wikipedia.org/w/index.php?title=Damper&oldid=751728585", Nov. 27, 2016.

Adam Marsh et al., A numerical investigation of energy dissipation with a shallow depth sloshing absorber, Applied Mathematical Modelling, vol. 34, Issue 10, Oct. 2010, pp. 2941-2957.

Kevin Bonsor, How Smart Structures Will Work, retrieved from https://science.howstuffworks.com/engineering/structural/smart-structure2.htm.

* cited by examiner

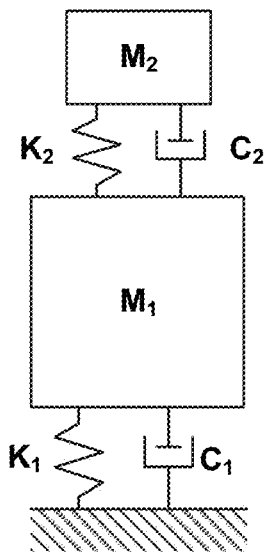
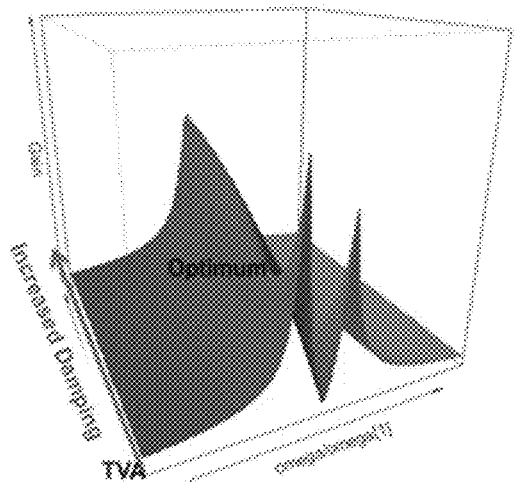
Fig. 1a
(Prior Art)
Fig. 1b
(Prior Art)
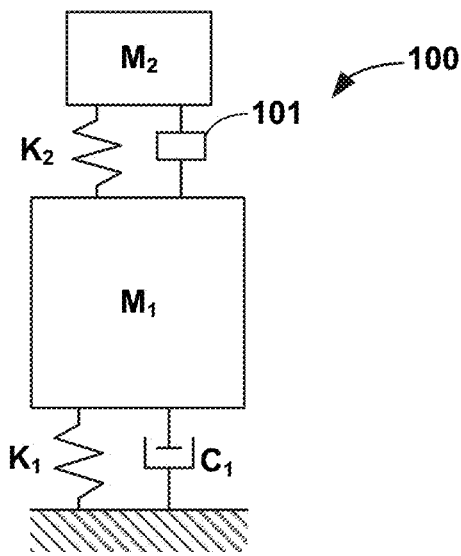
Fig. 2

DISRUPTIVE TUNED MASS SYSTEM AND METHOD

REFERENCE TO RELATED APPLICATIONS

This application claims priority to Provisional Patent Application U.S. Ser. No. 62/314,178, entitled "Disruptive Tuned Mass" and filed on Mar. 28, 2016, which is fully incorporated herein by reference.

GOVERNMENT LICENSE RIGHTS

This invention was made with government support under Contract Number NNM14AD20P, awarded by the National Aeronautics and Space Administration. The government has certain rights in the invention.

BACKGROUND AND SUMMARY

Tuned mass systems have been used for more than a century to mitigate undesirable dynamic responses of a primary system. A standard tuned mass damper (TMD) is a device consisting of a mass, a spring, and a damper that is attached to a structure in order to reduce the dynamic response of the structure. The frequency of the TMD is tuned to a particular structural frequency so that when that structural frequency is excited, the damper will resonate. Energy is dissipated by the inertial force of the TMD acting on the structure.

FIG. 1 represents a traditional prior art TMD system 10, where M1 represent a primary bulk mass. The bulk mass M1 vibrates when excited acting on spring K1 and damper C1. M2 is a secondary reaction mass (mitigating mass), K2 is a reaction mass spring rate, and C2 is a secondary damper. The TMD system 10 utilizes the resonant condition of the mitigating mass M2 to provide a means to dissipate energy out of the entire system. A drawback to current TMD systems is that they are a "responsive" approach to mitigating excitation. "Responsive" in this context means that their effectivity is directly dependent upon responding to the force input's frequency and amplitude. It takes time to transfer and dissipate the energy from the primary system M1 into the mitigating mass M2. During this transfer rise time, the primary system response is minimally mitigated.

The prior art TMD systems approach focuses on the transfer and dissipation of energy. There is an undesirable vibration condition that the systems are designed to mitigate and since most passive energy dissipation techniques rely upon velocity or displacement there is significant nonlinearity of the mitigated response to various input frequencies and amplitudes. TMDs tend to work well at a single vibration amplitude. For example, if the TMD functions well at medium vibration amplitude then it does not work as well at small or large vibration amplitudes due to the nonlinear characteristics of the standard C2 damping mechanism. A system and method that does not rely on responsive damping, and that provides a linear and force independent mitigation of excitation, is desired.

Another drawback, that is inherent with nonlinear characteristics of the standard C2 damping mechanism, is frequency sensitivity. The velocity of the flow pumping through the C2 mechanisms is different at various frequencies. For example the velocity traveling across a C2 loss mechanism at 5 Hz is half of the velocity at 10 Hz. Since the typical TMD C2 mechanism is to incorporate a viscous or columb device, the maximum energy dissipation can only occur at a specific frequency. Any other frequency will cause a different flow rate through C2 and therefore different loss coefficient. This is why TMD performance, which relies upon the resonant response of the M2 system, is highly sensitive to accuracy of tuning. The flow rate through the C2 changes drastically depending upon how well the M2 reaction system is tuned to the primary system. Therefore, an additional significant drawback of current TMD systems is their limitation to only effectively mitigate over a highly narrow frequency range.

A standard TMD is typically optimized by adjusting the reaction mass suspension stiffness (K2) and damping (C2) to maximize vibration mitigation. Adjustment of the K2 term is not difficult. The C2 term, on the other hand, can dramatically impair TMD attenuation performance if it is not carefully configured for the specific vibration amplitude and frequency.

A similar damping system known as a Tuned Vibration Absorber (TVA) utilizes the mitigating mass as a counter inertia/force mechanism. TVA systems typically have the same drawbacks as TMD systems, e.g., response time, nonlinearity, and narrowband response. With both the TVA and TMD approaches, energy has to be placed into the TVA or TMD system to mitigate response.

A system and method according to the present overcomes these multiple drawbacks by providing a resistance-to-motion controlled coupling mechanism that replaces prior art C2 dampers in the prior art TMD systems. It is this method and described system that fundamentally alters the primary system response by setting new modal gain system attributes and eliminates frequency tuning sensitivity. The resistance-to-motion controlled coupling mechanism does not dampen vibration in a responsive manner, as taught by resistance-to-motion mechanisms in the prior art, but rather changes the fundamental characteristics of the system by mandating allowable phase of participation between the masses. In other words the system dictates allowable coupling to set complex modeshape and gain.

Prior art methods are "responsive" in nature and generally require a transfer of energy into the secondary mass (M2) so the secondary mass responds and can either provide a counter inertia force (TVA) or provide a means to bleed energy out of the system (TMD). In contrast, the system according to the present disclosure is "transformative" in nature. It does not attempt to dissipate energy, but rather dictates the allowable phase of participation between the primary mass M1 and the secondary mass M2 with the resistance-to-motion controlled coupling C2 mechanism providing the desired resistance to the primary mass M1. Constant resistance will provide a constant phase of participation between the masses. Varying resistance will result in a corresponding varying of phase of participation between the masses. Each resistance level and its resulting phase of participation establishes a unique modal gain characteristic of the coupled system. A desired modal gain response is achievable by prescribing a resistance profile to any given force.

The current art provides the means to dictate the allowable participation between masses to set the fundamental modal gain response characteristics of a coupled system. Unlike the prior art systems, frequency matching between the primary system and sprung secondary system is not required to achieve this disruptive altering of modal characteristics. The same effectiveness as the prior art is achieved by simply dictating the phase of participation between masses wherever the sprung secondary system has modal mass participation in the combined system responses. I.e. not at a node point.

Historically, analysis of the C2 damping component of the TMD system has focused almost entirely upon the dissipation of energy. The objective of the TMD to date has been to bleed energy from the vibrating M2 component into the C2 dissipative component. While this approach can be used to generate a TMD design that mitigates vibration, the approach provides a nonlinear vibration mitigation methodology. The proposed method of controlling and managing the phase relationship between M1 and M2 independent of vibration amplitude produces a vibration mitigation device that significantly outperforms all previous TMD designs.

Modern TMD C2 damping mechanisms rely on flow of fluid or gas through an orifice to function. The C2 damping mechanism provides a "resistance to motion" between M1 and M2. The orifice based approach is characterized by a velocity squared ($V^2$) relationship between C2 force and relative velocity. This non-linear squared relationship generates a vibration mitigation approach that is only optimized for a singular vibration amplitude or excitation force. The non-linear relationship of the orifice based TMD system yields a dynamic mitigation mechanism that performs differently at low, medium, and high vibration amplitudes.

FIG. 1b shows the three dimensional Frequency Response Function FRF characteristics of the standard orifice based TMD system. The Abscissa (X-axis) quantifies modal response frequency while the Applicate (Z-axis) of the plot is system gain. The Ordinate (Y-axis) is the excitation force magnitude. It should be underscored that the excitation force magnitude is directly proportional to the C2 "resistance to motion" term resulting from the inherent force nonlinearity of the orifice based system. In the standard TMD system, low excitation force corresponds to low C2 "resistance to motion." Large excitation force corresponds to large C2 "resistance to motion." This highly nonlinear relationship is directly related to the velocity squared (V2) force dependency of the orifice mechanism.

The resulting 3-D diagram is referred to as the Hartog Domain and is characterized by two distinct zones. Zone 1 includes two "split modes" and occurs when C2 "resistance to motion" term is small. Zone 2 includes a single mode defined as the "coalesced" mode and is observed when C2 damping is large. In Zone 1, where the C2 "resistance to motion" is very low or even negligible, the lower frequency split mode responds with a phase relationship between M1 and M2 that is near 0 degrees (described as the in-phase mode). The higher frequency Zone 1 split mode responds with a phase relationship between M1 and M2 that is around 180 degrees (described as the out-of-phase mode).

As excitation force and the corresponding C2 "resistance to motion" increases, the lower and higher split modes reduce in gain and eventually coalesce into a single mode with a phase relationship around 90 degrees between M1 and M2. The emergence of the coalesced mode defines Zone 2. It is important to note that the modal phase relationships between M1 and M2 are transitional terms and in practice are almost never measured to be exactly 0.0, 180.0, or 90.0 degrees.

DESCRIPTION OF THE DRAWINGS

The patent or application file contains at least one drawing executed in color. Copies of this patent or patent application publication with color drawings will be provided by the Office upon request and payment of the necessary fee.

FIG. 1a is a block diagram of a prior art tuned mass damper (TMD) system.

FIG. 1b shows the three dimensional Frequency Response Function characteristics of a standard orifice-based TMD system.

FIG. 2 is a block diagram illustrating a disruptive tuned mass (DTM) system in accordance with an exemplary embodiment of the present disclosure.

DETAILED DESCRIPTION

Figures 3A, 3B, 3C, 3D:
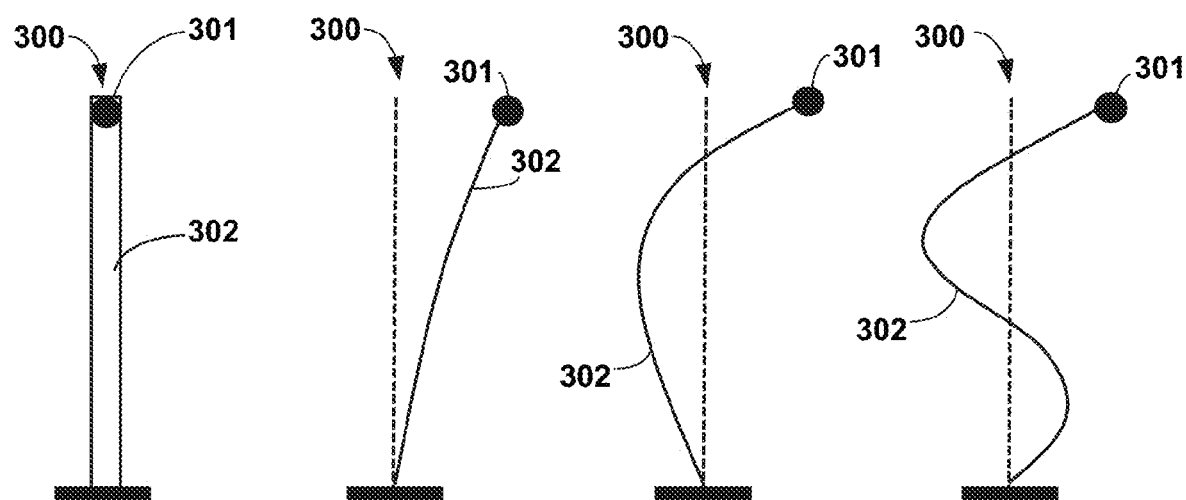
FIGS. 3a-3d illustrate modal participation of a sprung secondary mass within primary modes of a simple cantilevered beam.

FIG. 2 depicts a system 100 according to an exemplary embodiment of the present disclosure comprising a resistance-to-motion controlled coupling mechanism 101 that replaces prior art dampers C2 (FIG. 1) in the prior art TMD system 10 (FIG. 1). As discussed herein, the resistance-to-motion controlled coupling mechanism 101 does not dampen vibration in a responsive manner, as taught by the prior art, but rather changes the fundamental characteristics of the system. With the resistance-to-motion controlled coupling mechanism in place, the system 100 does not attempt to dissipate energy, but rather controls the coupling between the primary mass M1 and the secondary mass M2, with the resistance-to-motion controlled coupling mechanism 101 providing nearly constant linear resistance to the primary mass M1. In addition, the system also allows controlled coupling mechanism 101 to provide a variable resistance to the primary mass in order to customize the fundamental system response should input forces profiles suggest.

The system according to the present disclosure is referred to herein as a "Disruptive Tuned Mass (DTM)" system. Prior art tuned mass systems have focused on the responsive movement of M2 and not the disruptive behavior that M2 can provide with the resistance-to-motion controlled coupling mechanism 101 of the present approach. Employing M2 in a disruptive manner serves to eliminate the force and time dependencies that are inherent with the responsive TVA and TMD approaches, as further discussed herein. This is achieved by fundamentally altering the primary system response through the coupling mechanism 101 and the secondary mass.

In one embodiment, the resistance-to-motion controlled coupling mechanism 101 is a Variable Aperture Reciprocating Reed (VARR) valve (not shown) of the type disclosed in U.S. Pat. No. 8,939,178, which is incorporated herein by reference in its entirety. A VARR valve automatically adjusts its flow aperture (not shown) based on the pressure differential across the valve. The flow aperture changes with varying pressure differentials to achieve a desired flow schedule.

In another embodiment, the resistance-to-motion controlled coupling mechanism 101 comprises two "standard" reed valves aligned in opposite directions. Standard reed valves restrict the flow of gases or fluids to a single direction, opening and closing under changing pressure on each face. Two standard reed valves aligned in opposite directions can operate similarly to a VARR valve.

In both embodiments discussed above (VARR valve or two reed valves), the resistance-to-motion controlled coupling mechanism 101 has an effective aperture size that is small at small amplitudes, medium at medium amplitudes, and large at large amplitudes. The resistance-to-motion controlled coupling mechanism 101 is a compensative element that changes linearly in reaction to motion or force. Further, in both of these embodiments the resistance-to-motion controlled coupling mechanism 101 operates passively, i.e., with no external power or actuation required. In other embodiments, active resistance-to-motion controlled coupling mechanisms are employed.

An active resistance-to-motion controlled coupling system can be designed to operate in a manner similar to a VARR. An example of an active resistance-to-motion controlled coupling mechanism is a magnetorheological fluid (MR fluid), which is a type of smart fluid in a carrier fluid, usually a type of oil. When an MR fluid is subjected to a magnetic field, the fluid greatly increases its apparent viscosity. The increase in viscosity changes the resistance in proportion to the amplitude. This change can be used to control the resistance-to-motion controlled coupling characteristics.

Figure 17:
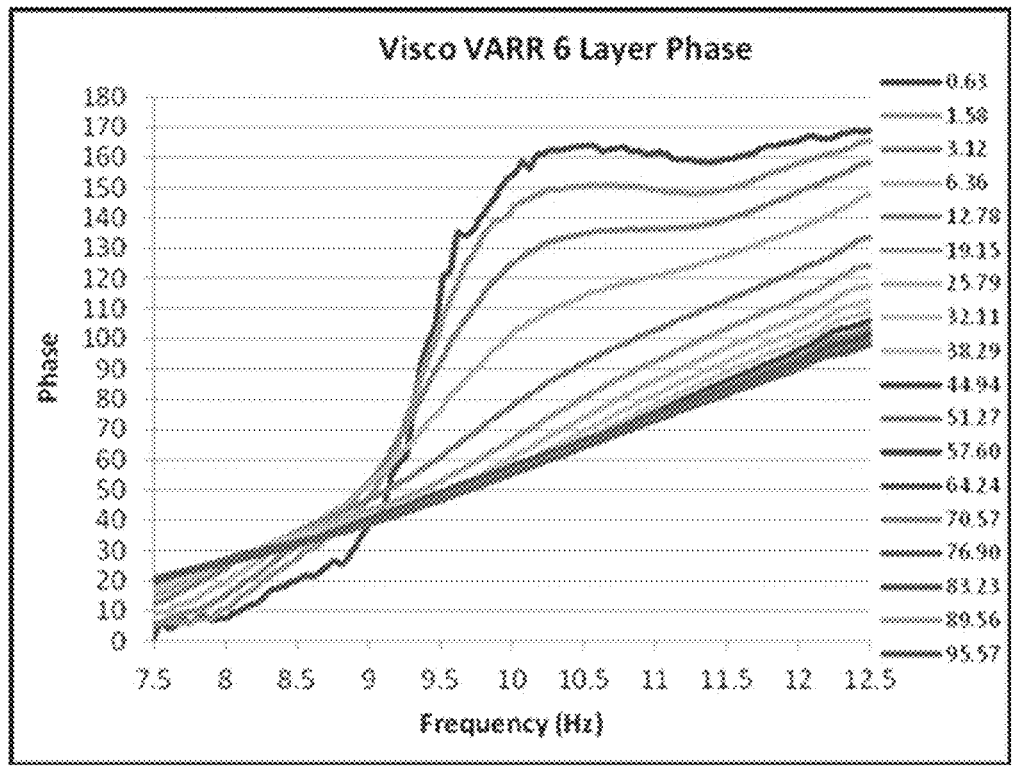
FIG. 17 depicts the phase relationship between the primary system mass M1 and the reaction mass M2 in the exemplary DTM system.
Figure 18:
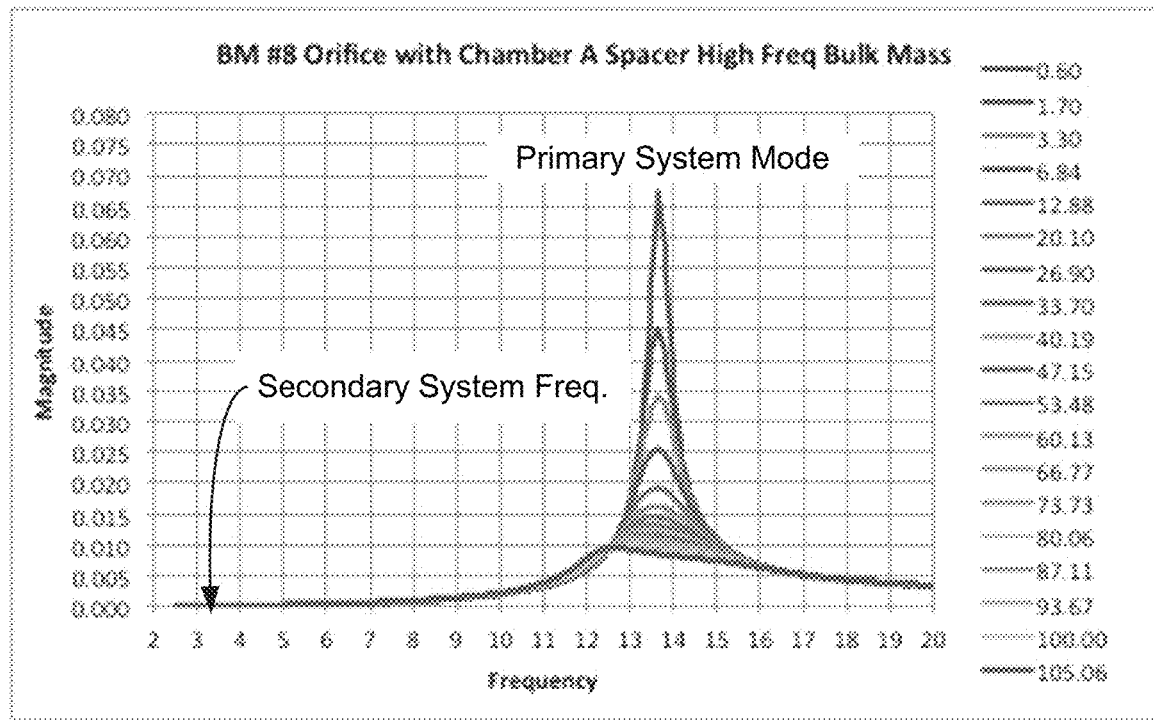
FIG. 18 depicts results of testing where resistance was dialed in to mandate phase of participation and modal gain.
Figure 20:
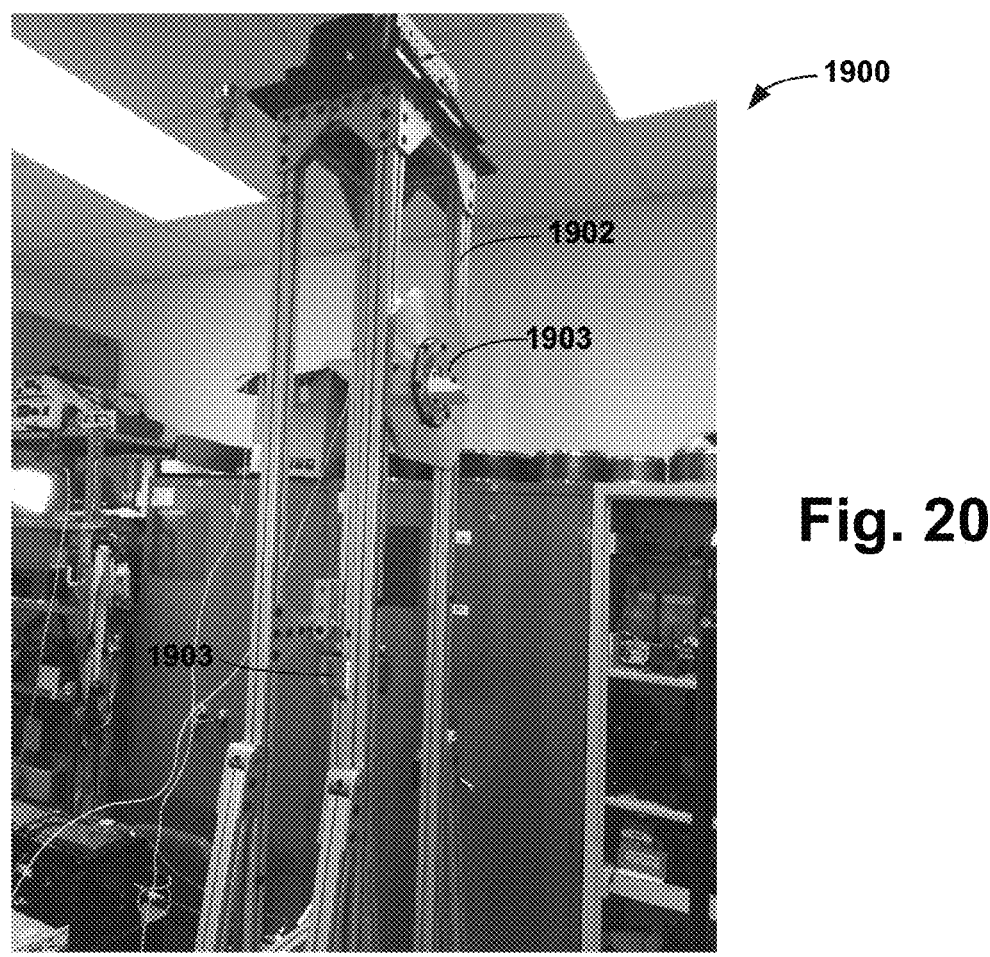
FIG. 20 depicts a test bed implementing a DTM system with a suspended pendulum system.

FIGS. 3a-3d illustrate a simple cantilevered beam system 300 with a secondary sprung mass 301, further illustrating the principles of an exemplary system according to the present disclosure. FIG. 3a shows a non-deformed beam 300 with a secondary sprung mass added 301. In FIGS. 3b-3d, the first three bending modes for a simple beam are shown. Line 302 illustrates the mode shape for each of these modes while, for comparative purposes, line 300 shows the non-deformed shape. FIG. 3b illustrates the first bending mode, at 3 Hz; FIG. 3c illustrates the second bending mode, at 18 Hz, and FIG. 3d illustrates the third bending mode, at 50 Hz. For each of these modes shown the sprung secondary mass 301 has significant modal mass participating in all three of these system modes. The system according to the present disclosure, via the resistance-to-motion controlled coupling mechanism (not shown), can be used to dictate the allowable phase of participation of this secondary mass as it modally participates in any or all of these system bending modes. This enables transformation of these fundamental system modal responses without having to match frequencies or dissipate any energy. The resistance between the secondary mass M2 (301) and the rest of the system is adjusted to dial in the desired phase lag of participation of the M2 (301) mass as it participates in each mode. This capability has been successfully demonstrated on multiple test beds and results are shown in FIGS. 17, 18 and 20, discussed further below.

Figure 4:
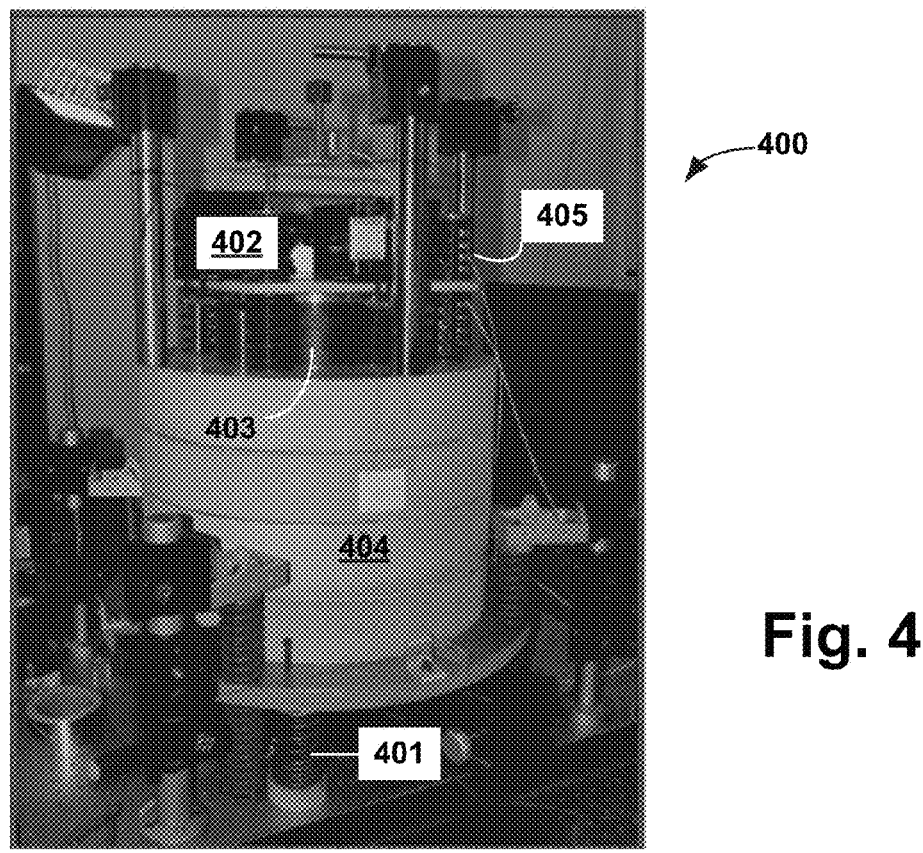
FIG. 4 is a photograph of an exemplary test system used to compare TMD system and DTM system responses.

Experimental Comparisons of Destructive Tuned Mass Systems with Tuned Mass Dampers A. Tuned Mass Damping System Test Tests were performed to demonstrate the different results obtained with tuned mass damper systems known in the art in comparison with the DTM system according to the present disclosure. FIG. 4 depicts a test system 400 for a test performed at the Experimental Modal Test Laboratory at Marshall Space Flight Center in Huntsville, Ala. The test system 400 comprised a bulk mass 404 (representing M1 in a two degree of freedom system), springs 401 (representing K1), reaction masses 402 (representing M2), reaction springs 405 (representing K2), and gas chamber/bellows 403. For tests of the system as a TMD system, an orifice (viscous loss mechanism, not shown) was used as a damper (C2). For tests of the system as a DTM system, the orifice was replaced with a VARR valve or equivalent conventional reed valve assembly.

Figure 5:
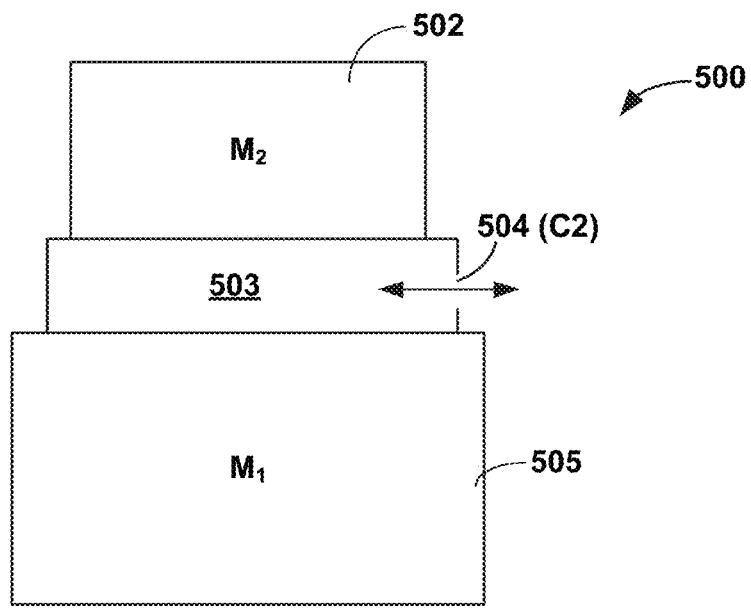
FIG. 5 is a functional representation of the test system of FIG. 4.

FIG. 5 is a functional representation of the test system of FIG. 4, where the system 500 comprises the bulk mass 505 (M1), the reaction mass 502 (M2), a gas chamber/bellows 503, and an orifice 504 (C2).

The gas chamber/bellows 503 comprised a compressible bellows chamber that was used to drive air through the orifice 504 during relative displacement between the primary mass 505 (M1) and the reaction mass 502 (M2). The compliant bellows gas chamber system provided a convenient method for creating the orifice-based C2 "resistance to motion" mechanism for the conventional tuned mass damper system.

Multiple force-linearity tests were conducted on the 550 pound TMD system 500 using slow sine-sweep techniques. Excitation force, M1 acceleration, gas chamber pressure, and M2 acceleration were recorded at discrete excitation magnitudes. This approach produced a series of Frequency Response Function plots that were assembled into a 3-dimensional waterfall plot (FIG. 7), which is directly representative of the aforementioned Hartog domain. The Absicissa (X-axis) is modal response frequency in Hertz while the Applicate (Z-axis) of the plot is system gain expressed in g/lb. The Ordinate (Y-axis) is the excitation force input applied to M2 and is proportional to the "resistance to motion" (C2 damping) term.

Figure 6:
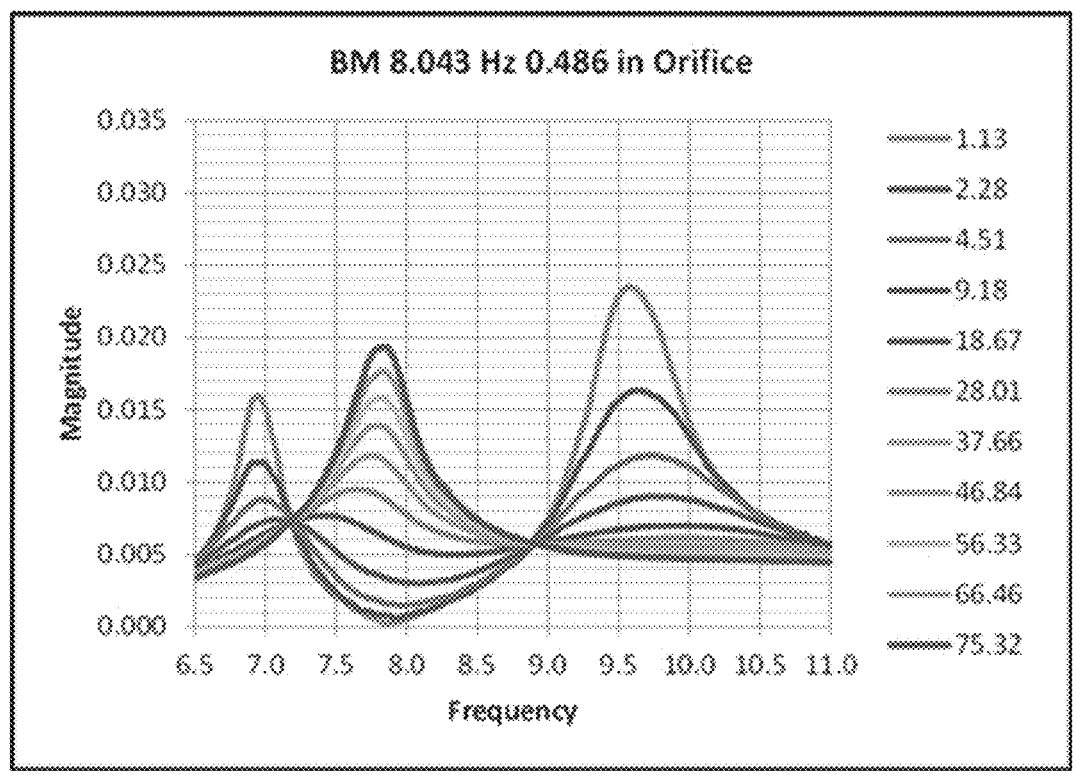
FIG. 6 depicts exemplary test results from a test of a TMD system, showing input force versus magnitude and frequency.
Figure 7:
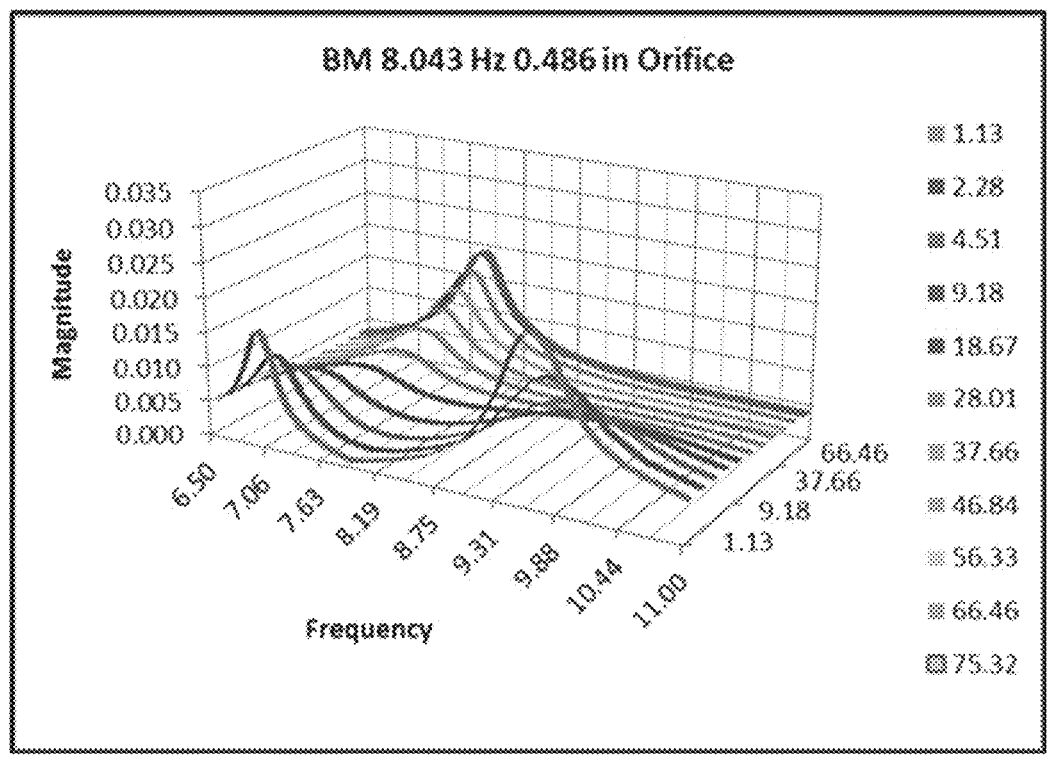
FIG. 7 depicts 3d test results from a test of a TMD system, showing input force versus magnitude and frequency.

FIGS. 6 and 7 show the extended series of Frequency Response Functions (FRFs) acquired from the empirical TMD testbed of the system 500 utilizing a 0.486 inch diameter C2 airflow orifice. The sine sweep measurements were recorded with the M1 accelerometer at sine sweep peak to peak force levels ranging from 1.13 lbs. to 75.32 lbs. The orifice-based approach was characterized by a velocity squared (V2) relationship between force and relative velocity between M2 and M1. Thus, at low vibration amplitude, the orifice-based C2 "resistance to motion" mechanism provided little "resistance to motion" between M1 and M2. As vibration amplitude increased, the orifice-based C2 mechanism generated dramatically increased "resistance to motion" between M1 and M2. A standard orifice-based TMD cannot function well at low, medium, and large vibration amplitudes due to the nonlinear force characteristics of the orifice.

At low excitation force, the two distinct Hartog Zone 1 split modes are clearly present with the low in-phase mode at 6.9 Hz and the high out-of-phase mode at 9.6 Hz. At minimal excitation force levels, the C2 orifice-based "resistance to motion" device simply generated too little net resistance to mitigate the vibration response of the Zone 1 split modes. As the excitation force increased, vibration amplitude increased and the subsequent gas flow through the C2 orifice increased as a squared function of velocity leading to the Hartog Zone 2 coalesced mode at approximately 17 lbs. peak to peak excitation force. Beyond 17 lbs. peak to peak excitation force, M2 simply could not keep pace with the vibration amplitude of M1. The gain of the coalesced mode continuously increased until the amplitude of vibration exceeded safety limitations.

Figure 8:
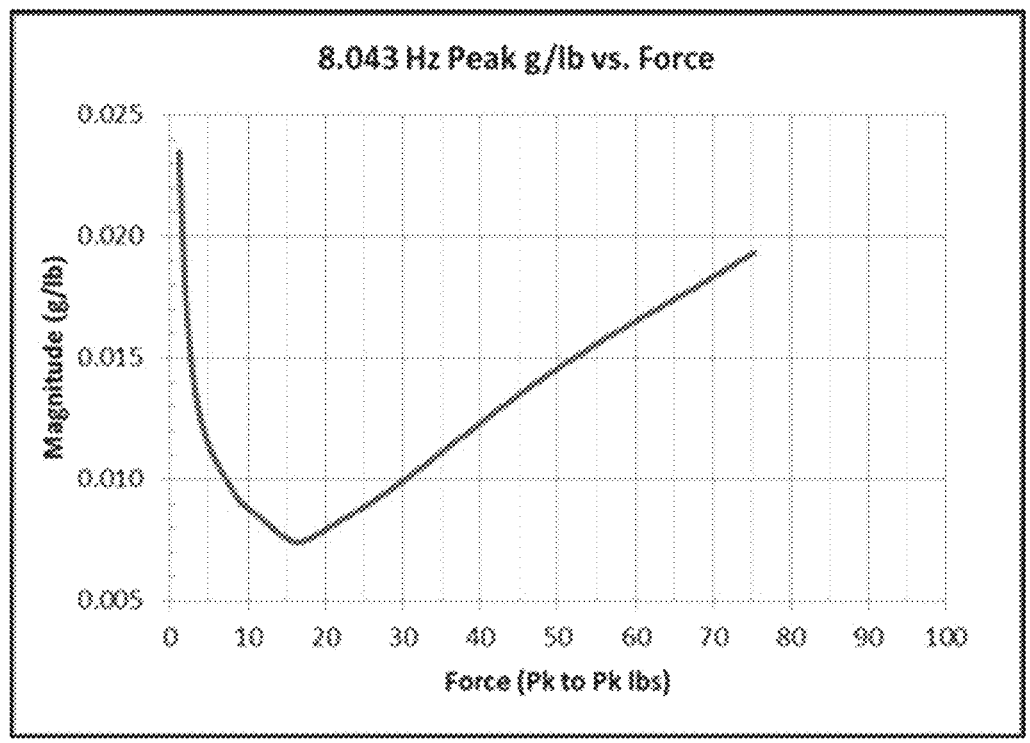
FIG. 8 depicts a side view of the isometric Hartog Domain plot series from a test of a TMD system.

FIG. 8 depicts a side view of the isometric Hartog Domain plot series from the same test bed testing. The transition from Zone 1 (split modes) to Zone 2 (coalesced mode) can be clearly observed at the local minimum of the plot around 17 lbs. peak-to-peak excitation force. Above and below this optimum excitation force magnitude, vibration mitigation performance is impaired. The standard method for overcoming the performance-limiting nonlinear response attributes of the TMD is to increase reaction mass magnitude.

Figure 9:
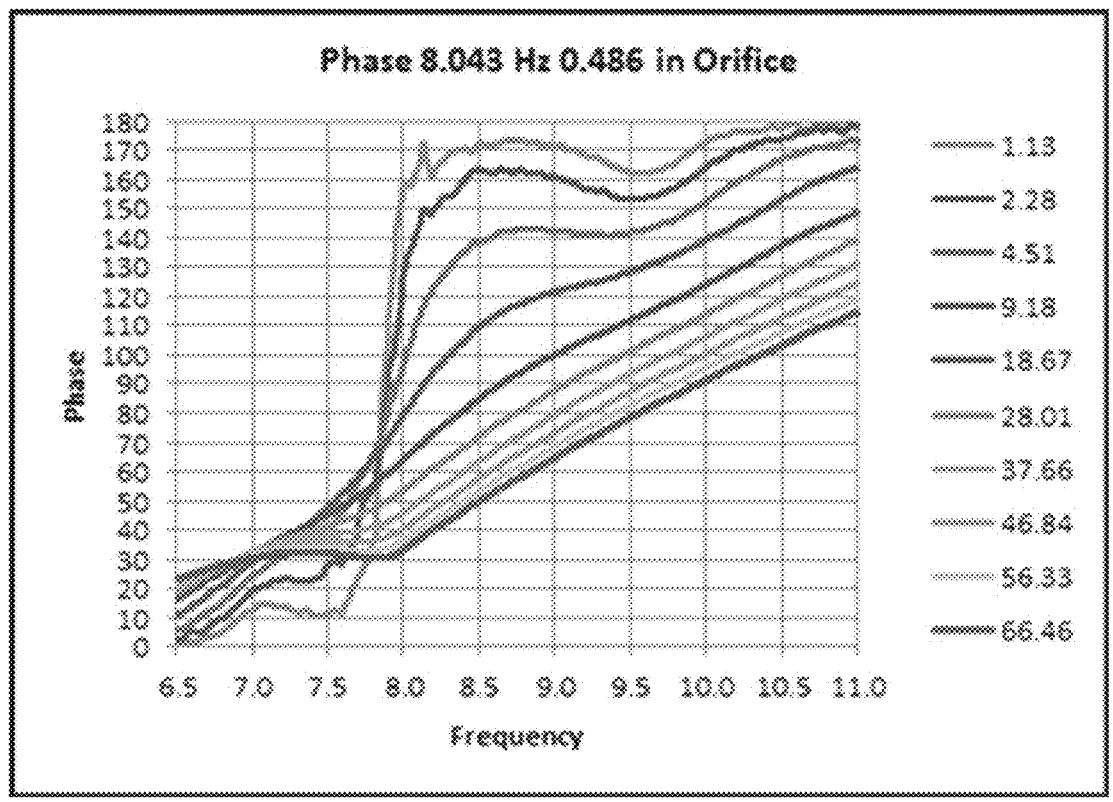
FIG. 9 depicts the phase relationship between the primary system mass M1 and the reaction mass M2 in a TMD system.

FIG. 9 depicts the phase relationship between the primary system mass M1 and the reaction mass M2. This is an important plot series that clearly shows that the phase relationship of the standard orifice-equipped TMD system is nonlinear and changes significantly as vibration amplitude increases. The nonlinear phase condition is the principle issue that limits TMD vibration attenuation performance.

B. Disruptive Tuned Mass System Test

Figure 10:
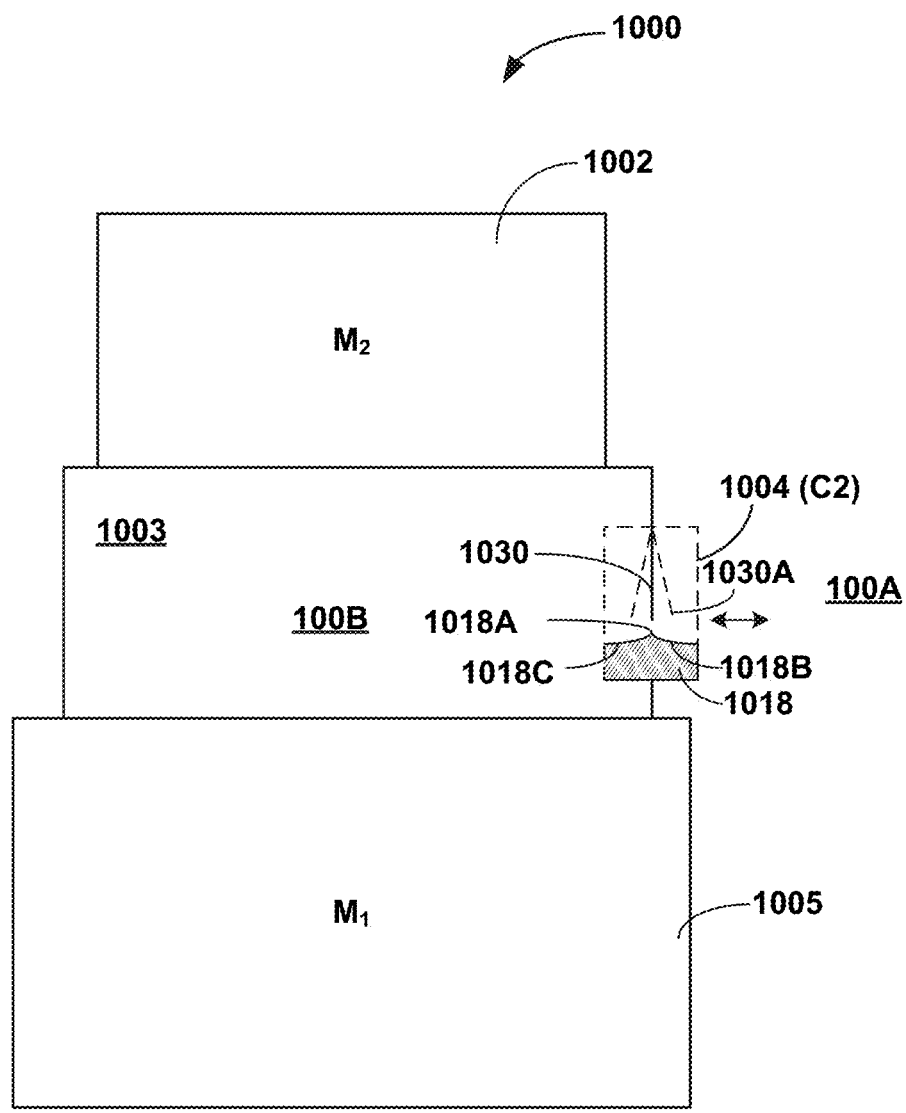
FIG. 10 is a functional representation of the test setup for a DTM system according to an exemplary embodiment of the present disclosure.

FIG. 10 is a functional representation of the test setup for a DTM system 1000 according to an exemplary embodiment of the present disclosure. In this test setup, the "C2" orifice 504 in the system 500 (FIG. 5) was replaced with a resistance-to-motion controlled coupling mechanism 101 (FIG. 2). This mechanism 101 creates a new type of Tuned Mass System that does not rely upon dissipation energy to bleed off the inertial energy of a vibrating system. DTM technology rather controls the phase of coupling between the primary system M1 and the secondary mass M2 to alter and control the fundamental response attributes of the primary system M1. This is a transformative process and establishes new dynamic response attributes of the system. The focus is purely upon disruption of the primary system to generate muted response of the dynamic system. A DTM will always outperform an equivalently designed TMD while also bypassing the major limitations of TMDs such as force and time dependencies.

The DTM system 1000 of the illustrated embodiment comprises the bulk mass 1005 (M1), a reaction mass 1002 (M2), a gas chamber/bellows 1003, and a resistance-to-motion controlled coupling mechanism 101. In this embodiment, the resistance-to-motion controlled coupling mechanism is a VARR valve 101 of the type discussed in U.S. Pat. No. 8,939,178.

The gas chamber/bellows 1003 comprises a compressible bellows chamber used to drive air through the VARR valve 1004 during relative displacement between the primary mass 1005 (M1) and the reaction mass 1002 (M2).

The VARR valve 1004 comprises a semi-rigid plate or "reed" 1030 that extends across a through hole region 1020. The reed 1030 defines a cantilever such that the plate/cantilever's outbound/free edge 1030A is adjacent, but spaced apart from, a linear apex 1018A of a flow schedule insert 1018 when the pressure differential on either side of the plate 1030 is zero, i.e., when plate 1030 is in a static pressure environment.

The flow schedule insert 1018 defines a contoured profile that helps define a variable aperture for the reed valve 1004. In the illustrated embodiment, the contoured surface profile of the insert 1018 includes the linear apex 1018A, a concave surface 1018B extending away from the linear apex 1018A in one direction of through hole region 1020, and a concave surface 1018C extending away from linear apex 1018A in the opposite direction of through hole region 1020.

In operation, the VARR valve 1004 has flow regions 100A and 100B. When pressure in region 100B is greater than in region 100A, the plate 1030 deflects into region 100A. Conversely, when pressure in region 100A is greater than in region 100B, the plate 1030 deflects into region 100B. The contoured surfaces 1018B and 1018C of insert 1018 vary the flow aperture of the reed valve 1004. In the illustrated embodiment, the concave nature of surfaces 1018B and 1018C will cause the flow aperture to geometrically increase (i.e., based on the geometric shape used for surfaces 1018B and 1018C) with increased pressure differentials between regions 100A and 100B thereby increasing flow and reducing flow restriction as the pressure differential increases.

The key facilitative component of DTM technology is the resistance-to-motion controlled coupling mechanism 101. As illustrated in FIG. 9, standard TMD systems do not manage and engineer the relative phase between the M1 primary mass and the M2 reaction mass. However, a careful review of FIGS. 6-9 show that standard TMD vibration mitigation methods do achieve a maximum attenuation level at a single phase magnitude between M1 and M2. The DTM approach, on the other hand, utilizes the resistance-to-motion controlled coupling mechanism to manage system phase independent of vibration amplitude and force. The proprietary "controlled coupling" C2 approach can be thought of as a variable orifice that is small when vibration amplitudes are minimum and large when amplitudes are maximum. Thus the resistance-to-motion controlled coupling mechanism responds to demand and adjusts its effective orifice size adaptively.

The VARR valve 1004 provides variable reciprocal flow that is proportional to flow demand. As discussed above, the VARR valve 1004 employs a reed petal that deflects when differential pressure exists. A variable-aperture reciprocating reed valve includes a valve body defining a through-hole region with at least a portion of a surface of the through-hole region defining a contoured profile. A semi-rigid plate (reed petal) is affixed on one side thereof to the valve body to define a cantilever extending across the through-hole region wherein at least one free edge of the cantilever opposes the contoured-profile portion of the through-hole region in a non-contact relationship. The VARR's reciprocal flow control is determined by pressure differential (delta pressure) between inlet and outlet sides of the valve. The VARR valve is designed to provide a variable size aperture that proportionally changes in size relative to gas flow demand. Gas flow can traverse through the device in a forward/reverse manner or be used in a single flow direction. The VARR valve can be designed and optimized to meet a broad range of flow conditions. It effectively functions as a variable aperture orifice. Reed petal stiffness and surface area as well as the contoured surfaces of the flow schedule facilitate unprecedented adjustability.

Recall that the force provided by an orifice based C2 mechanism is nonlinear and increases as a squared function of relative velocity. When the conventional nonlinear orifice C2 mechanism is used for TMD applications, the phase between M1 and M2 varies significantly at different vibration amplitudes. Reed valve C2 mechanisms such as the VARR valve provide a near linear force relationship resulting in a Tuned Mass System in which the phase relationship between M1 and M2 can be engineered to dramatically improve vibration attenuation performance.

It should be noted that "controlled coupling" can be achieved through mechanisms other than the VARR valve such as more conventional reed valve assemblies or active controls systems. The principle aspects that the VARR provides are a near linear force to velocity relationship, passive operation, and simplicity of design.

To validate DTM vibration mitigation performance, the identical laboratory based TMD system previously tested with conventional orifices was reconfigured for additional tests. The standard orifice based TMD C2 mechanism was removed and replaced with a "controlled coupling" C2 reed valve assembly. All other system characteristics such as M1 primary mass, M2 reaction mass, K1 and K2 suspension spring rates, and the initial C1 primary mass damping remained unchanged. The "controlled coupling" C2 reed valve assembly was tuned to provide near constant phase lag between the M1 primary mass and the M2 reaction mass. FIGS. 11 through 14 detail the DTM test results. The plots were generated utilizing identical ordinate scales to facilitate head to head comparison with the previously shown TMD test results (FIGS. 6 through 9).

Figure 11:
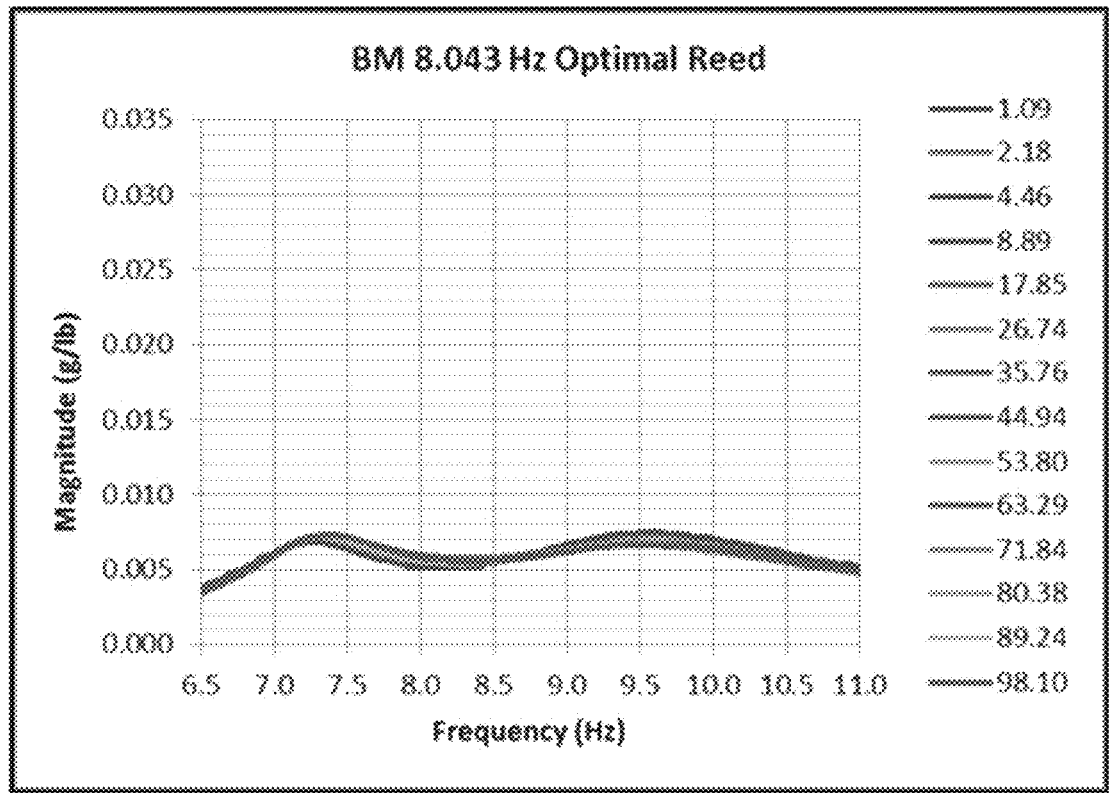
FIG. 11 depicts exemplary test results from a test of a DTM system, showing input force versus magnitude and frequency.
Figure 12:
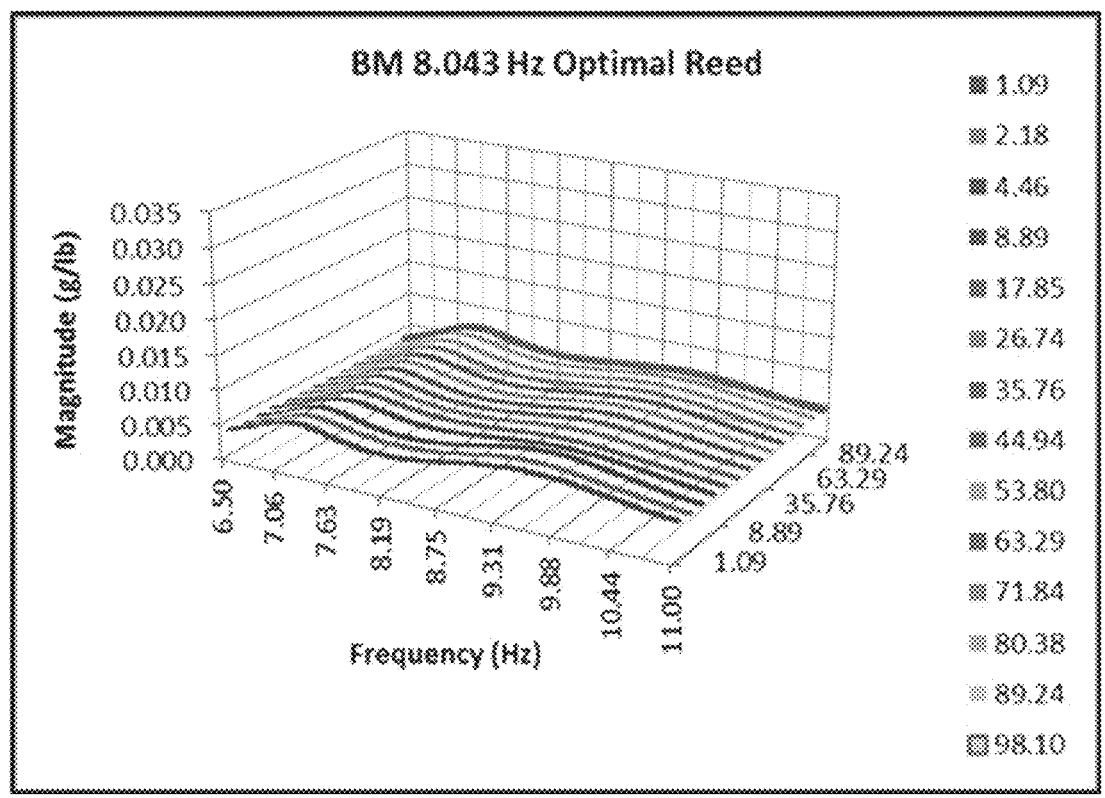
FIG. 12 depicts 3d test results of the test shown in FIG. 11.

FIGS. 11 and 12 show the Hartog domain composed of an extended series of DTM Frequency Response Functions (FRFs) utilizing the "controlled coupling" C2 reed valve approach. Note that the DTM system remains functioning in Zone 1 of the Hartog domain at all excitation force magnitudes. The system is well optimized and clearly force linear. This is true for low, medium, high, and very high force excitation levels. The force linearity FRF measurements were acquired with the M1 primary mass accelerometer at sine sweep peak to peak force levels ranging from 1.09 lbs. to 98.10 lbs. The optimized mitigation performance of the DTM approach allowed an increased tolerance for high level excitation. The previously tested orifice equipped TMD system became unstable at 75.32 lbs. peak to peak excitation force while the DTM system was stable up to 98.10 lbs. peak to peak. Again, no increase in reaction mass was required to achieve the additional mitigation performance.

Figure 13:
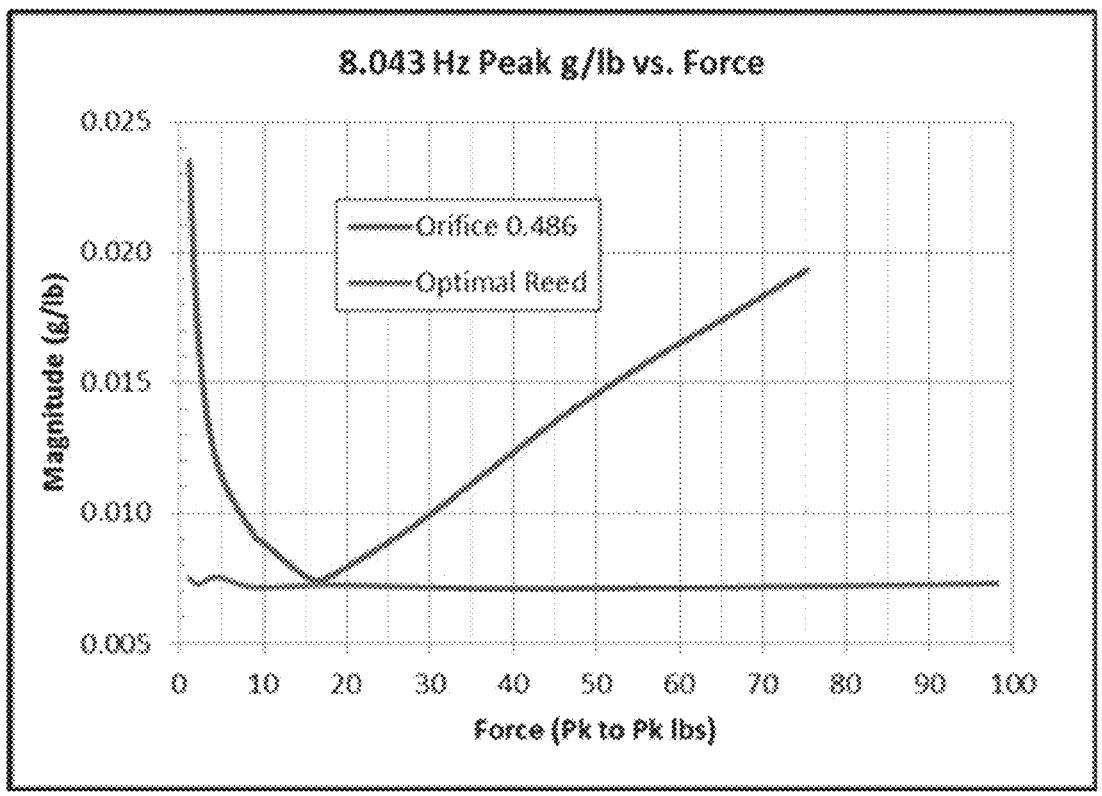
FIG. 13 depicts a side view of the isometric Hartog Domain plot series for the tests depicted in FIGS. 10 and 12.

FIG. 13 depicts a side view of the isometric Hartog Domain plot series. The previous orifice based TMD trace was included for direct comparison to the "controlled compressibility" DTM results. Note that the DTM system contains no local minimum since the DTM system remains optimized at every discrete excitation force level. The DTM dramatically outperforms the classic TMD methodology at all force excitation levels.

Figure 14:
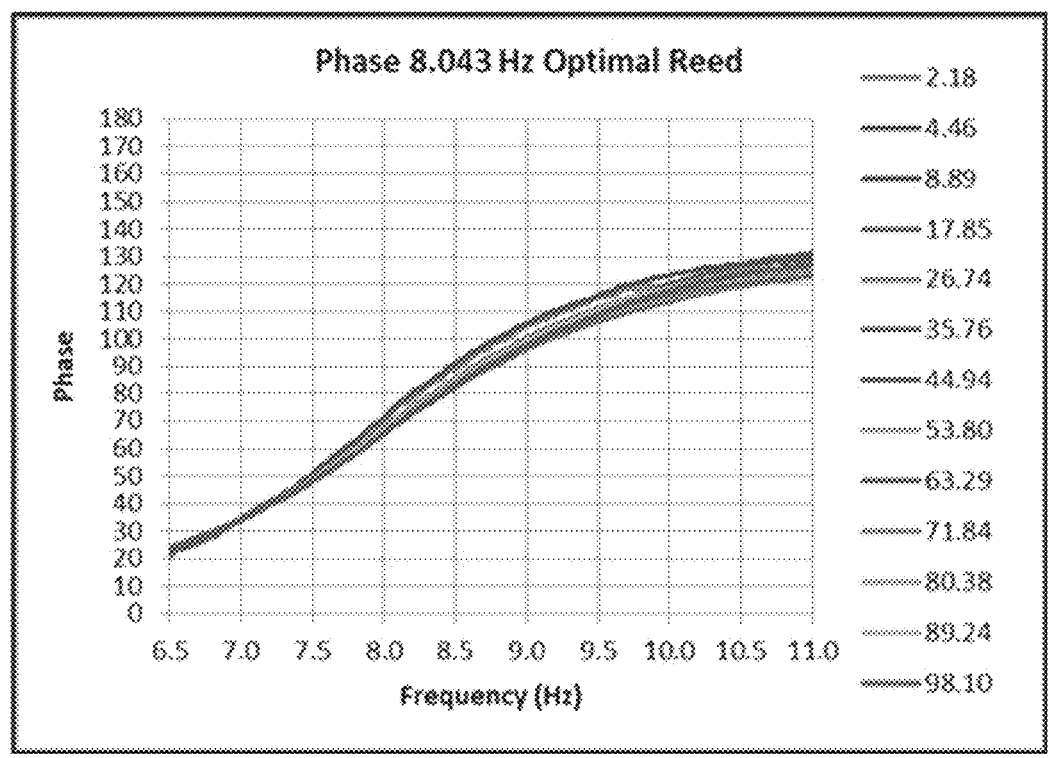
FIG. 14 depicts the phase traces and shows that the phase relationship between the reaction mass and the primary mass remains essentially constant across the entire range of excitation force levels.

FIG. 14 depicts the phase traces and shows that the phase relationship between the reaction mass and the primary mass remains essentially constant across the entire range of excitation force levels. This is a direct result of employing the "controlled coupling" DTM approach. While the reed valve assembly was optimized to maintain the very low gain Zone 1 Hartog split modes throughout the extended excitation force range, the reed valve could be optimized differently to provide a different M1 to M2 phase relationship.

Conceptually, the nonlinear limitations of orifice based TMD vibration mitigation systems can be readily observed when reviewing the TMD and DTM force linearity test results. Stated simply, gas flow through a set orifice is only optimal for vibration mitigation at a singular vibration amplitude.

The "controlled coupling" approach used in the previous DTM test series maintained nearly constant phase over an extended operation range of vibration amplitudes operating entirely in the Zone 1 Hartog split mode domain. While this approach clearly maximized vibration attenuation performance throughout the operational range, it should be noted that constant phase may not always be the principle objective of the DTM "controlled coupling" method. For example, it may be advantageous to transition from the Zone 2 coalesce mode to the Zone 1 split mode domain as vibration amplitude increases. Or, "controlled coupling" could be used to obtain only the Zone 2 coalesced mode throughout the entire DTM operational range. In addition, "controlled coupling" could be employed to generate a DTM system that only operated in the Zone 1 split mode domain (as demonstrated by the previous DTM test results).

An additional test series was conducted to further demonstrate the advantageous performance characteristics of a "controlled coupling" equipped DTM. A VARR valve was designed with a relatively soft reed petal in conjunction with an aggressive flow area schedule that provided generous flow at low vibration amplitude and constrained flow at large vibration amplitude. The objective was to engineer the "controlled coupling" such that Zone 1 split modes could be obtained at very low vibration amplitude. Then as vibration amplitude increased, the system would transition into the Zone 2 coalesced mode. A principle objective was to hold the system gain as well as the M1 to M2 phase relationship constant at medium and large vibration amplitude to maximize attenuation performance during extreme vibration events such as earthquakes.

Figure 15:
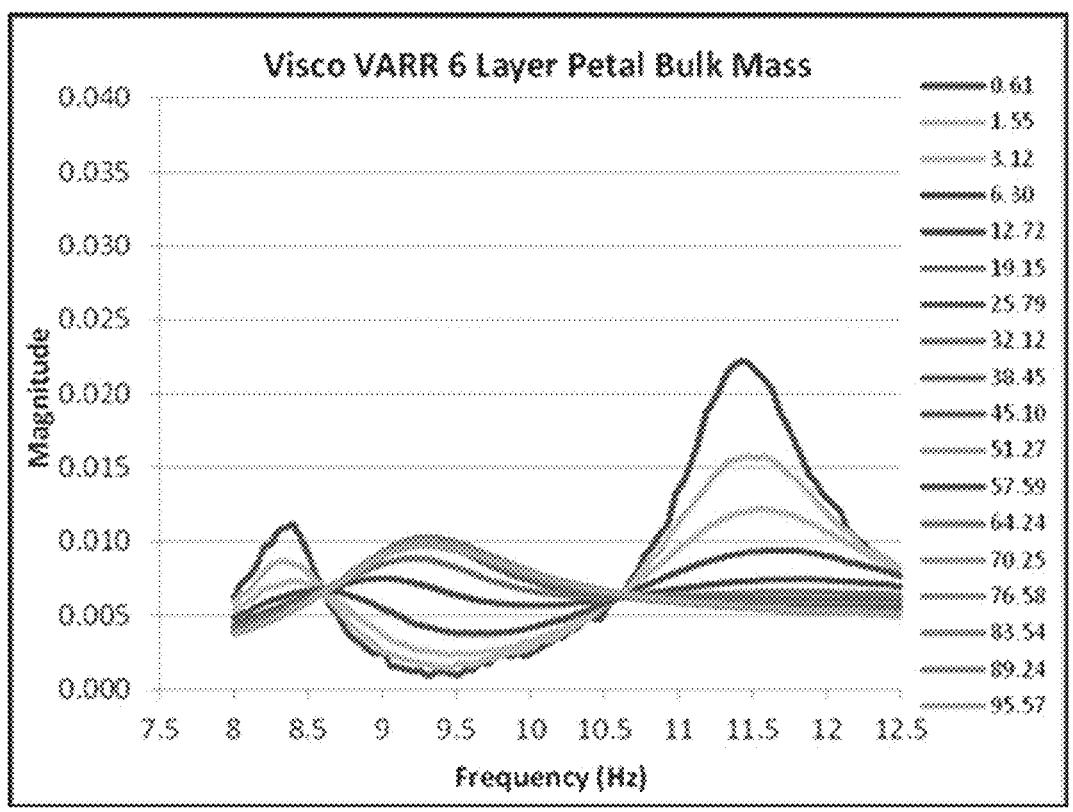
FIG. 15 depicts exemplary test results from a test of a DTM system, where controlled coupling was engineered such that Zone 1 split modes were obtained at low vibration amplitude, and as amplitude increased, the system transitioned into Zone 2 coalesced mode.
Figure 16:
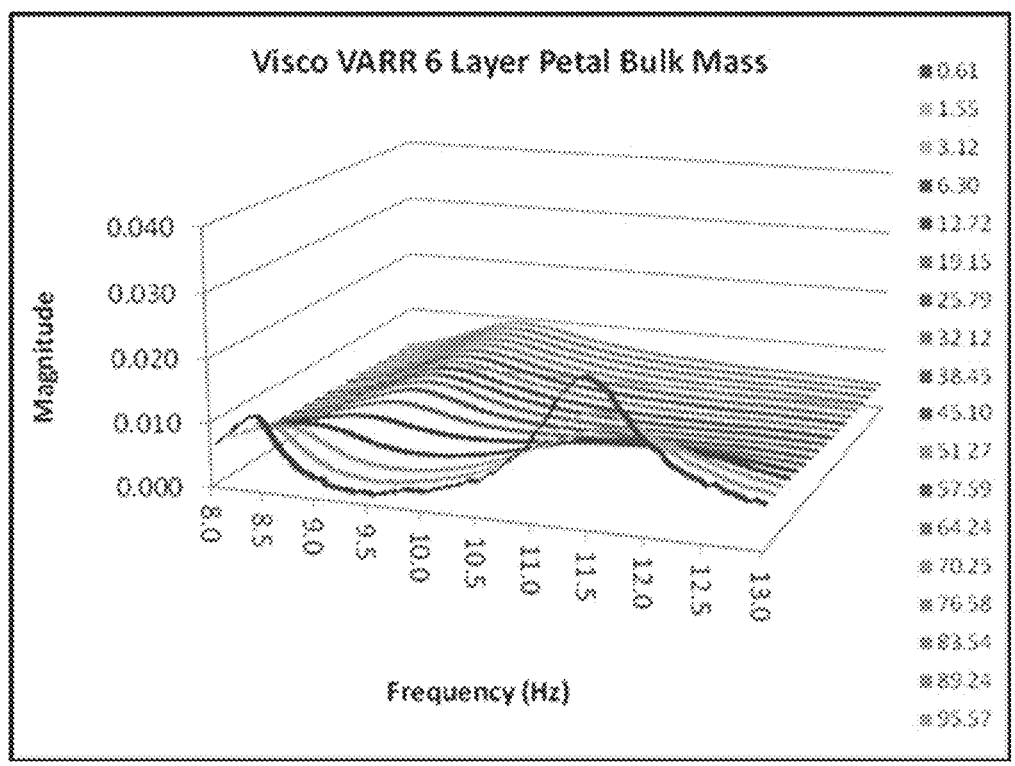
FIG. 16 depicts the results of FIG. 15 in 3d format.

FIGS. 15 and 16 depict the results of this testing. As shown in these figures, Zone 1 split modes exist at excitation force levels below 12.72 lbs. peak to peak. Above 12.72 lbs., the Zone 2 coalesced mode emerged with constant gain from 25.79 to 95.57. FIG. 17 shows the phase relationship between the reaction mass and the primary mass of the system. Once the system transitions from Zone 1 to Zone 2, the M1 to M2 phase remains essentially constant as excitation force increases.

Figure 19:
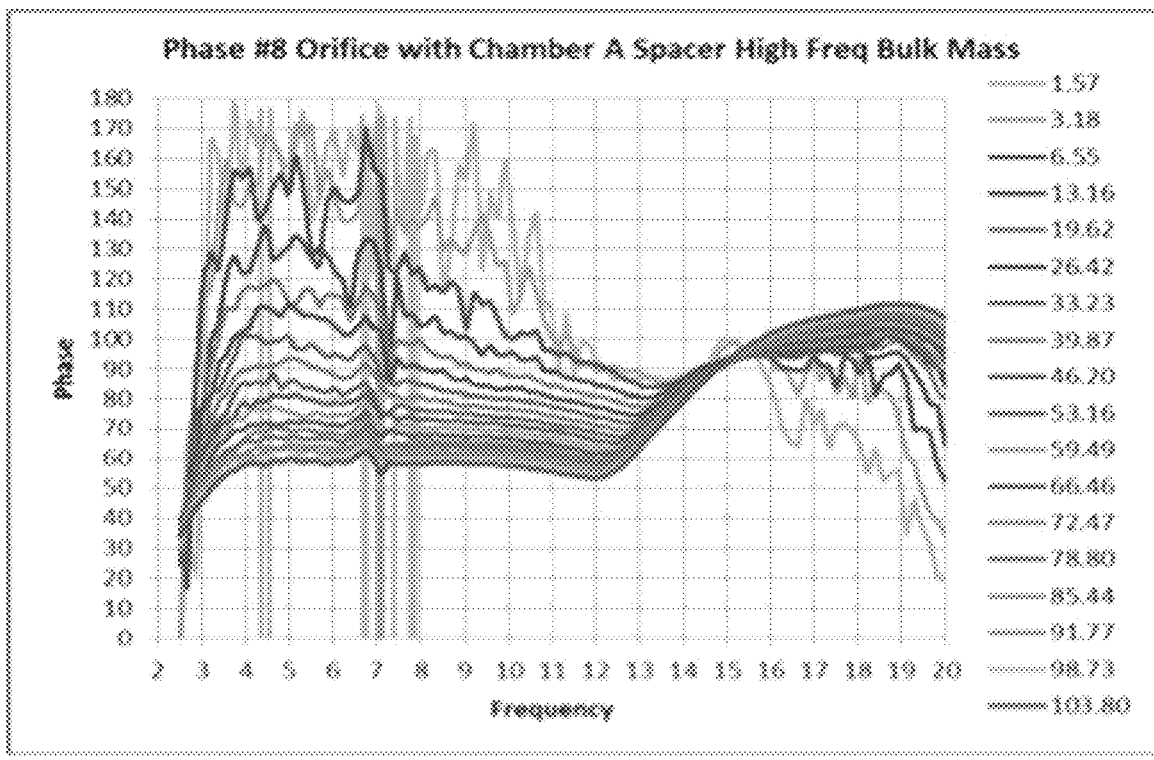
FIG. 19 depicts the results of the test shown in FIG. 18, plotting frequency against phase.

C. Tests Mandating Phase of Participation and Modal Gain Via Dialing in Resistance for a Two Degree of Freedom System Testing was performed to demonstrate dialing in resistance for a two degree of freedom system. The same test bed discussed above (and illustrated in FIGS. 4 and 5) was used for this testing. However, instead of matching frequencies, the secondary mass is sprung near 3 Hz while the primary system (M1) is sprung near 13.5 Hz. As the resistance between M2 and M1 is changed a unique phase relationship is achieved for each resistance-to-motion controlled coupling level. Each unique phase of participation sets a new modal gain characteristic of the overall system. FIGS. 18 and 19 show the results of this testing.

Figure 21:
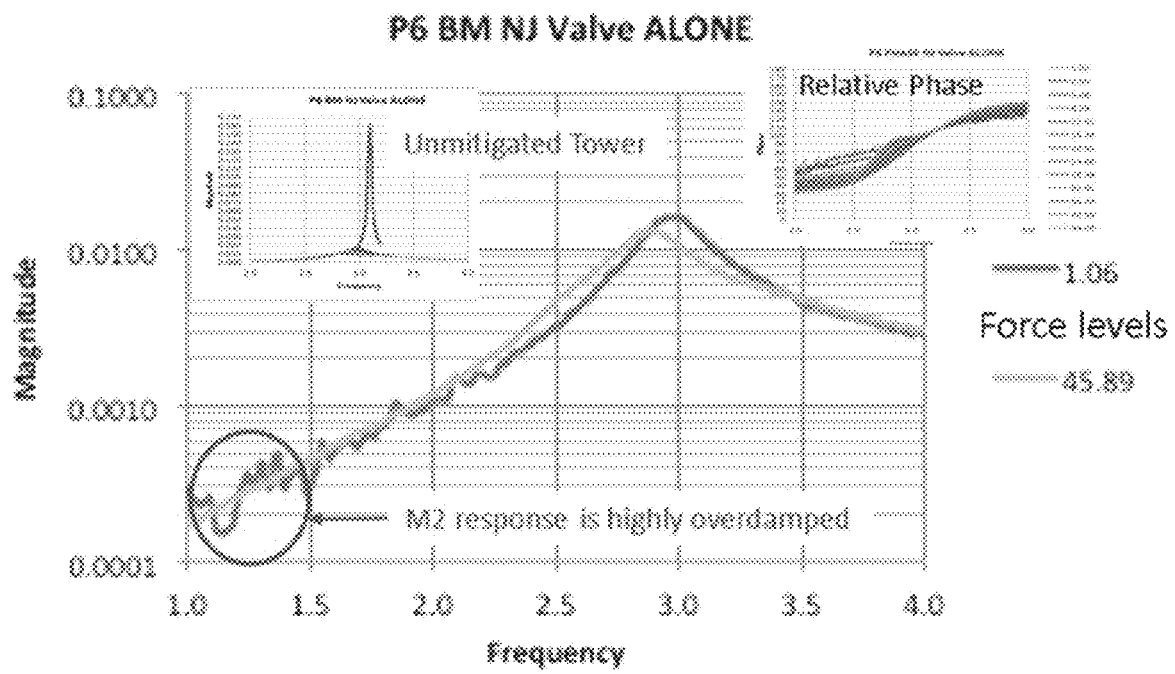
FIG. 21 depicts results of the test of the system shown in FIG. 20.

FIG. 20 illustrates another test bed implementing a DTM system with a suspended pendulum system 1900. In this system, a pendulum 1901 is suspended from a tower 1902. A resistance-to-motion controlled coupling mechanism 1903 is coupled between the pendulum 1901 and the tower 1902. The pendulum 1901 is sprung near 1.2 Hz and the primary tower mode is about 3 Hz. As with the prior system, the 3 Hz tower response is mitigated by dialing in the resistance between itself and the other sprung mass and not by matching frequencies or dissipating energy out of the system. For both of these examples, the resonant response of the sprung mass is not distinguishable in the data. The resistant within the resistance-to-motion controlled coupling mechanism 1903 is high enough to cause the sprung mass mode to be highly overdamped. FIG. 21 depicts the results of this testing.

This disclosure may be provided in other specific forms and embodiments without departing from the essential characteristics as described herein. The embodiments described are to be considered in all aspects as illustrative only and not restrictive in any manner.

What is claimed is:

1. A disruptive tuned mass system comprising:
   a bulk mass acted upon by an excitation amplitude;
   a reaction mass coupled to the bulk mass, the reaction mass having a reaction mass spring rate; and
   a resistance-to-motion controlled coupling mechanism associated with the reaction mass, the resistance-to-motion controlled coupling mechanism configured to proportionally modulate independent of excitation force such that the relative phase of the bulk mass and the reaction mass is substantially controlled throughout an extended range of excitation amplitude.

2. The system of claim 1, wherein the resistance-to-motion controlled coupling mechanism is further configured to cause the relative phase of the bulk mass and the reaction mass to be substantially constant throughout the extended range.

3. The system of claim 1, wherein the resistance-to-motion controlled coupling mechanism comprises a passive mechanism.

4. The system of claim 3, wherein the resistance-to-motion controlled coupling mechanism comprises a Variable Aperture Reciprocating Reed (VARR) valve.

5. The system of claim 3, wherein the resistance-to-motion controlled coupling mechanism comprises a plurality of reed valves.

6. The system of claim 1, wherein the resistance-to-motion controlled coupling mechanism comprises an active mechanism.

7. The system of claim 6, wherein the resistance-to-motion controlled coupling mechanism comprises a magnetorheological fluid.

8. The system of claim 1, wherein the reaction mass comprises a fluid.

9. A method of modifying the reaction of a bulk mass system acted upon by external excitation, the method comprising:
   coupling a reaction mass to the bulk mass;
   coupling a resistance-to-motion controlled coupling mechanism between the bulk mass and the reaction mass;
   controlling the relative phase of the bulk mass and the reaction mass with the resistance-to-motion controlled coupling mechanism throughout an extended range of excitation amplitude.

10. The method of claim 9, wherein the step of controlling the relative phase of the bulk mass and the reaction mass with the resistance-to-motion controlled coupling mechanism comprises proportionally modulating the bulk mass independent of excitation force such that the relative phase of the bulk mass and the reaction mass is substantially constant and force-independent throughout the extended range of excitation amplitude.

11. The method of claim 9, wherein the step of controlling the relative phase of the bulk mass and the reaction mass comprises proportionally modulating the bulk mass independent of excitation force such that the relative phase of the bulk mass and the reaction mass is substantially constant for a first portion of the range of excitation amplitude and substantially varied for a second portion of the range of excitation amplitude.

12. The method of 9, wherein the step of coupling a resistance-to-motion controlled coupling mechanism between the bulk mass and the reaction mass comprises coupling a Variable Aperture Reciprocating Reed (VARR) valve between the bulk mass and the reaction mass.

13. The method of claim 9, wherein the step of coupling a resistance-to-motion controlled coupling mechanism between the bulk mass and the reaction mass comprises coupling a plurality of reed valves between the bulk mass and the reaction mass.

14. The method of claim 9, wherein the step of coupling a resistance-to-motion controlled coupling mechanism between the bulk mass and the reaction mass comprises subjecting a magnetorheological fluid to a magnetic field.

15. The method of claim 9, wherein the reaction mass has a reaction mass spring rate with a frequency significantly lower than the bulk mass frequency.

* * * * *